United States Patent [19]
Armstrong

[11] Patent Number: 4,944,124
[45] Date of Patent: Jul. 31, 1990

[54] DECORATIVE PANEL WITH CUTLINE

[75] Inventor: Larry Armstrong, Eufaula, Okla.

[73] Assignee: Reil Rock Products, Inc., Eufaula, Okla.

[21] Appl. No.: 371,124

[22] Filed: Jun. 26, 1989

Related U.S. Application Data

[63] Continuation of Ser. No. 91,387, Aug. 31, 1987, abandoned.

[51] Int. Cl.[5] .............................................. B60R 27/00
[52] U.S. Cl. .................................. 52/169.12; 52/100; 52/DIG. 3
[58] Field of Search ...................... 52/98, 169.12, 100, 52/314, 315, 316, DIG. 3, 311; 428/58; 404/41, 42

[56] References Cited

U.S. PATENT DOCUMENTS

Re. 28,987 10/1976 Iacona ........................ 52/DIG. 3 X
3,882,218 5/1975 Bixel, Jr. .................... 52/DIG. 3 X
4,001,361 1/1977 Unruh .......................... 52/169.12 X

*Primary Examiner*—David A. Scherbel
*Assistant Examiner*—Creighton Smith
*Attorney, Agent, or Firm*—William S. Dorman

[57] ABSTRACT

A molded rectangular panel for use as skirting on a mobile home or the like, comprising a panel having a raised and detailed masonry surface, a portion of masonry surface adjacent one end of the panel terminating along a line which constitutes a cutline or a line of severance for that end such that a given panel, when the end is severed along the cutline, can be placed in overlapping relationship with an adjacent panel of the same design such that the interruption of the masonry pattern appears to be avoided.

2 Claims, 2 Drawing Sheets

DECORATIVE PANEL WITH CUTLINE

This application is a continuation of application Ser. No. 091,387, filed Aug. 31, 1987, now abandoned.

BACKGROUND OF THE INVENTION

1. Field of the Invention

The present invention relates to building construction elements and is, more particularly, directed to a decorative facade panel for use as skirting, as for example in conjunction with mobile homes. More especially, the present invention relates to a panel, as referred to above, provided with a cutline along which an end portion of the panel can be removed by cutting for a purpose which will hereinafter appear.

2. The Prior Art

Various forms of skirting panels are available to conceal the undercarriage of mobile homes and similar structures. These panels extend between the lower portion of the mobile home sidewall and the ground and are typically fabricated of metal or fiberglass and, more recently, expanded polystyrene foam. These panels are molded or otherwise formed with an exterior surface which simulates masonry such as brick, stone, tile or other construction material according to well known techniques in the art of molding metal and plastic.

Obviously, it is not possible or practical to mold panels which will extend, in one piece, along the entire length or width of a mobile home. Thus, a plurality of panels are attached, side by side, along the various areas to be covered. Unfortunately, the place where two panels adjoin or come together will present an interruption in the pattern. This is more particularly true where the pattern is a simulated rock pattern. The present invention involves a cutline adjacent the rock pattern on one panel so that the end portion of that panel can be cut or removed. The cut portion of a given panel can be placed adjacent another panel to overlap the end thereof and abut against the rock pattern of the second panel so as to give a single continuous effect to the rock pattern.

A preliminary search was conducted on the present invention and the following patents were found in the search:

| PATENTEE | U.S. Pat. No. | ISSUE DATE |
|---|---|---|
| Diamond | 2,847,721 | August 19, 1958 |
| Mollman | 3,613,326 | October 19, 1971 |
| Bixel, Jr. | 3,882,218 | May 6, 1975 |
| Terwilliger | 3,991,529 | November 16, 1976 |
| Unruh | 4,001,361 | January 4, 1977 |
| Jordan et al. | 4,016,692 | April 12, 1977 |
| Terwilliger | 4,079,554 | March 21, 1978 |
| Childress, Jr. et at. | 4,172,344 | October 30, 1979 |
| Infantino | 4,241,554 | December 30, 1980 |
| Keller | 4,275,540 | June 30, 1981 |
| Salazar | 4,644,719 | February 24, 1987 |

The Patent to Diamond shows simulated brick panels wherein projecting slabs 20 on one panel can be inserted into cutouts 21 in an adjacent panel. The adjacent panels, therefore, are put together like pieces of a jigsaw puzzle.

The Patent to Mollman shows a plurality of brick panels having, as the title indicates, stepped edges.

The Patent to Bixel, Jr. merely shows the cutting of panels 10 from a larger block or panel 12 by means of an electric cutting wire 14.

The Patent to Terwilliger '529 shows the making of a simulated brick panel by gluing a plurality of individual simulated tiles on a panel which has a simulated mortar surface.

The Patent to Unruh shows a plurality of individual panels wherein each panel has a plurality of projections 18 which are receivable in corresponding spaces 19.

The Patent to Jordan et al. relates to a composite paving structure made up of a plurality of units which are set in adjacent relationship. The adjacent units are so arranged with respect to each other that recesses are formed in which supplementing stones are disposed.

The Patent to Terwilliger '554 is essentially the same as Terwilliger Patent '529 previously discussed.

The Patent to Childress, Jr. et al. discloses a masonry block having spaced, removable, vertical flanges.

The Patent to Infantino discloses a decorative skirting panel system wherein adjacent panels are provided with vertically slidable side edge interlocks.

The Patent to Keller discloses a rigid plastic simulated brick wall section of a box-like structure which comprises individual sections having overhanging bricks in alternate tiers to provide an interlocking panel-like construction of adjacent sections.

The Patent to Salazar discloses wall panels havdng ends which are adapted to make an interlock with the ends of adjacent similiarly constructed panels.

SUMMARY OF INVENTION

The present invention relates to building construction elements and, more particularly, to a decorative skirting panel for use, for example, in conjunction with mobile homes. Each panel of the present invention is preferably provided with a raised background simulating a stone type construction. That is, the stone pattern is intended to represent a plurality of stones which are placed one on top of the other and adjacent each other with mortar in between. The panels are preferably rectangular in shape with the long side of the rectangle being disposed in a horizontal position. The short side of the rectangle will, therefore, be vertical. Adjacent one horizontal end of each panel is provided a line of demarcation between the end of the rock pattern and the short remainder of the end of the panel. This line will be referred to as a "cutline".

The panel can be used as such in a conventional sense. That is, one can use the panels of the present invention (without taking advantage of the cutline) and place them ene-to-end just as before. Preferably, however, and in accordance with the present invention, the person who is placing these decorative around the bottom of a mobile home will cut off the end of the panel along the cutline and then place the thus cut edge, in overlapping relation, over the end of the next adjacent panel. The cutline is such that the rock pattern of the cut panel will appear to merge with the rock pattern of the adjacent panel. In this manner, the interruption of the rock pattern, as previously experienced in prior erection of similar panels, will be avoided.

DETAIL DESCRIPTION OF THE PREFERRED EMBODIMENTS

Figure 1:
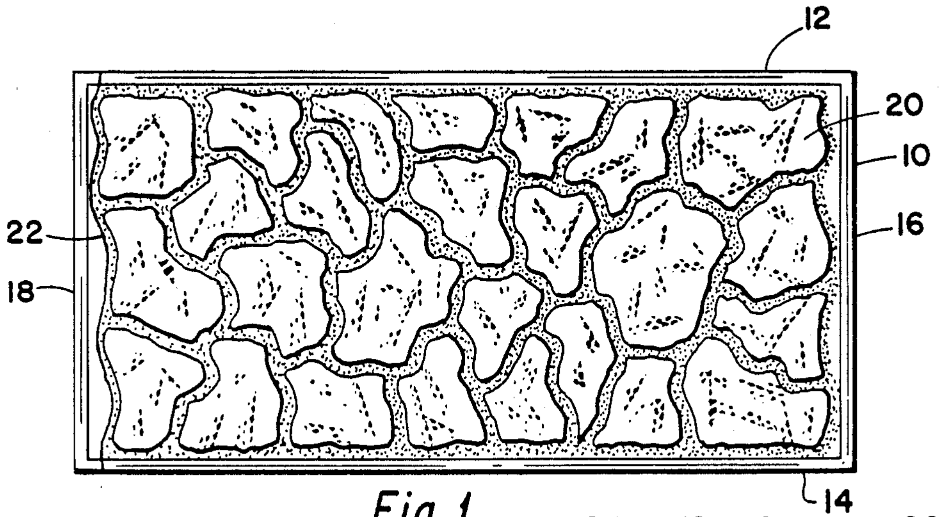
FIG. 1 is a front elevation of a panel made in accordance with the present invention.

Referring to the drawings in detail, FIG. 1 shows a decorative panel 10, which is generally made in accordanced with the method disclosed in Armstrong U.S. Pat. No. 4,656,722 issued on Apr. 14, 1987 and entitled "Method of Forming a Decorative Panel of Molded Plastic". By virtue of the techniques employed in the aforementioned patent, the panel 10 will have raised portions 20 which will simulate a rock pattern. As indicated heretofore, the panel is essentially rectangular in shape, with the long sides 12 and 14 of the rectangle being essentially horizontal and the shorter sides of the rectangle 16 and 18 being essentially vertical.

In accordance with the present invention, a cutline 22 is provided adjacent the end 18 of the panel 10. Also, preferably, cutline 22 will be located adjacent the left-hand end of the rock pattern 20 and at an elevation slightly above the base of the panel 10. The cutline 22 will have an ouline which corresponds with the outline at the right-hand end of the rock pattern for a purpose which will hereinafter appear.

Figure 2:
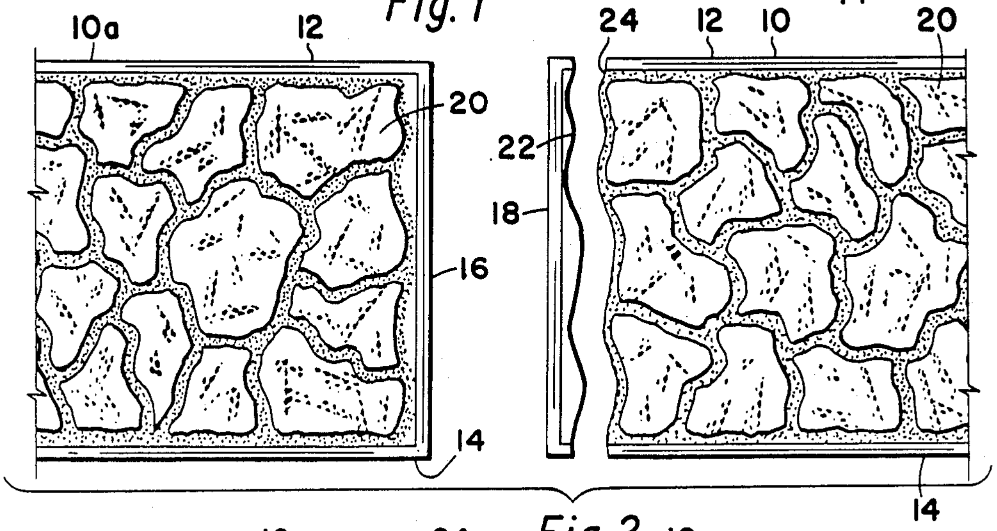
FIG. 2 is an exploded view showing, at the right, the end of one panel made in accordance with the present invention with the left-hand portion severed along the cutline and, to the left, the right-hand portion of an adjacent panel which is to be mated with the left-hand portion of the right panel.
Figure 3:
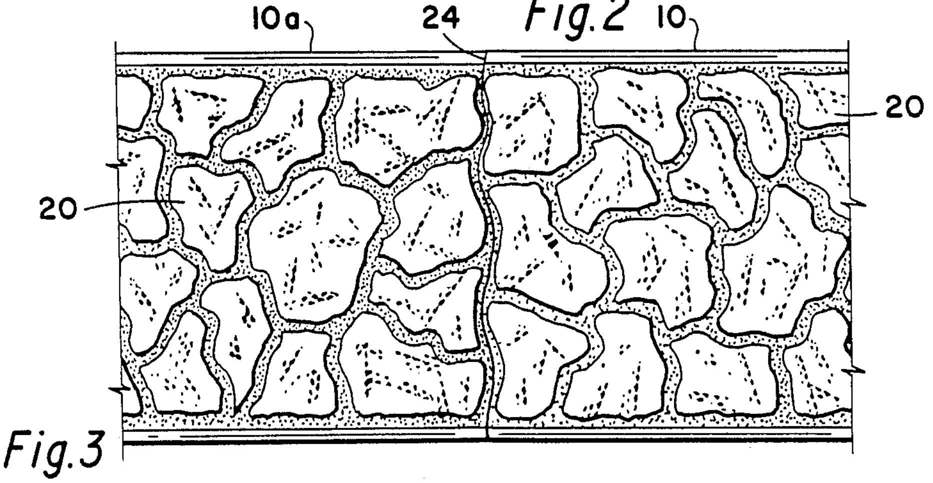
FIG. 3 is a view showing the progression from FIG. 2 wherein the two panels are placed in proper mating relationship.

As shown in FIG. 2, the left-hand portion of this figure shows the right-hand end of a panel 10*a* which has been constructed in the same manner that the panel 10 of FIG. 1 has been constructed; the right-hand portion of this figure represents a panel 10, such as shown in FIG. 1, wherein the left-hand portion has already been severed along the cutline 22 by merely cutting along this line. The left-hand end of the cut panel 10 is designated by the reference character 24, but this is also the same as the cutline itself. Obviously, when the severed portion (which is shown in a separated condition from the panel 10) is removed, then the right-hand panel can be moved into abutting position with respect to the left-hand panel 10*a*. The completion of this movement, referred to above, is shown in FIG. 3 where the right-hand panel 10 is, in fact, disposed in abutting relationship with respect to the panel 10*a* and the cutline 24 is shown as providing an adjacent interrelationship between the rock pattern of the two panels. Since the outline of the cutline 22 is the same as the outline at the right-hand end of the rock pattern 20, the composite rock pattern does not appear to be interrupted.

Figure 4:
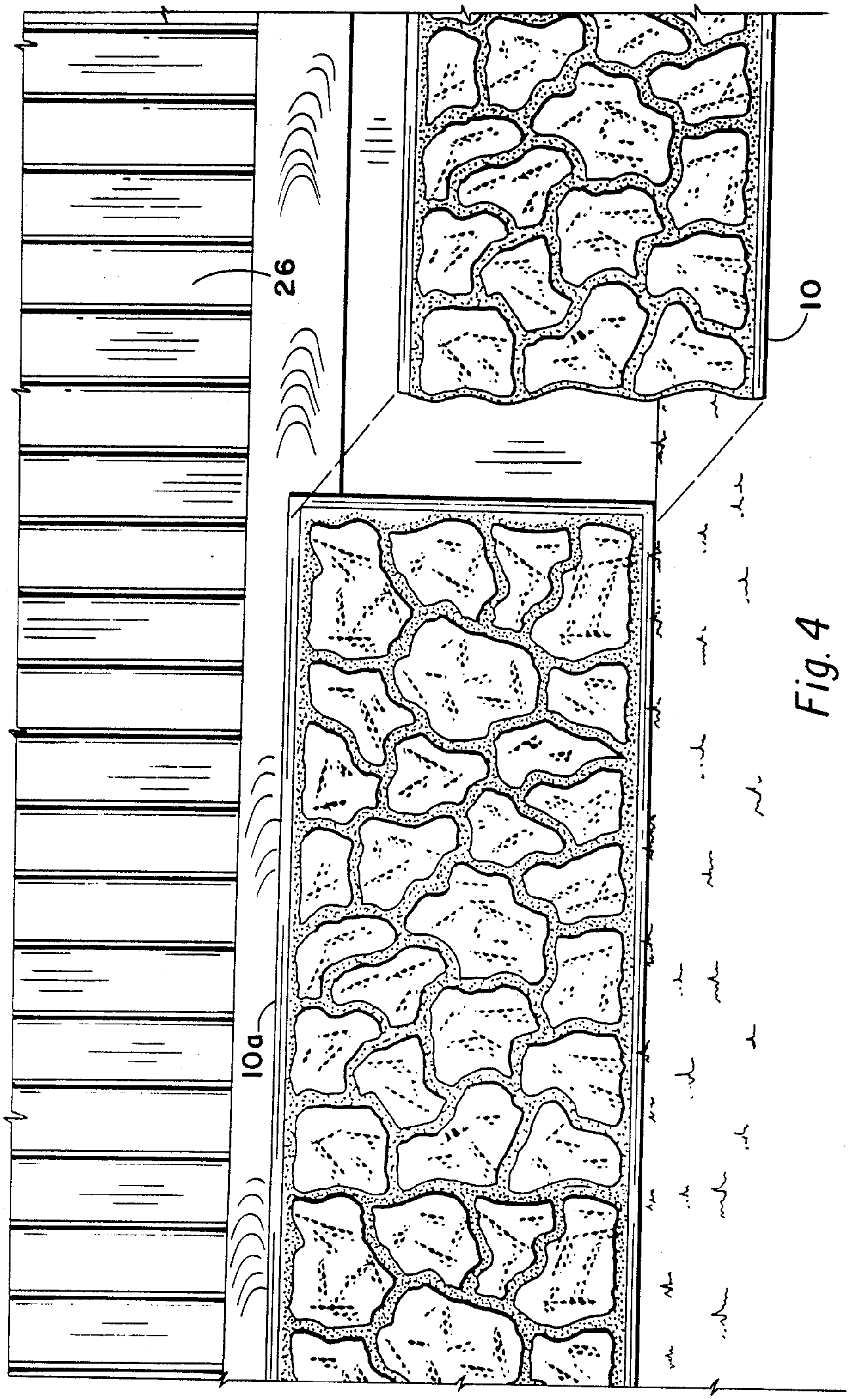
FIG. 4 is a view, somewhat similar to FIG. 2, but showing the lower portion of a mobile home with two panels already in place and indicating the interposition of a third panel.

As shown in FIG. 4 a composite panel arrangement is shown as disposed along the base of mobile home 26, only a portion of which has been shown for the purpose of convenience. The panel section 10*a* (shown to the left) is actually the composite of two panels which have already been placed together as shown in FIG. 3. The right-hand panel 10 is shown, in exploded relationship, as being ready to be positioned over the right-hand end of the panel sections that are already in place. The right-hand panel can now be secured to the underside of the mobile home in any conventional manner.

Whereas the present invention has been described in particular relation to the drawings attached hereto, other and further modifications, apart from those shown or suggested herein, may be made within the spirit and scope of this invention.

What is claimed is:

1. A molded rectangular panel for use as skirting on a mobile home or the like, comprising a panel having a raised and detailed masonry surface in the form of a rock pattern, a portion of the masonry surface adjacent one end of the panel terminating along a line which constitutes a cutline or a line of severance for that end such that a given panel, when the end is severed along the cutline, can be placed in overlapping relationship with an adjacent panel of the same design such that the interruption of the masonry pattern appears to be avoided.

2. A molded retangular panel as set forth in claim 1 wherein the cutline is located adjacent one end of the rock pattern, said cutline following a pattern similar to the opposite end of the rock pattern.

* * * * *

UNITED STATES PATENT AND TRADEMARK OFFICE

CERTIFICATE OF CORRECTION

PATENT NO. : 4,944,124

DATED : July 31, 1990

INVENTOR(S) : Larry Armstrong

It is certified that error appears in the above-identified patent and that said Letters Patent is hereby corrected as shown below:

On the title page delete:

"[73] Assignee: Reil Rock Products, Inc., Eufaula, Okla.

Signed and Sealed this

Thirty-first Day of March, 1992

*Attest:*

HARRY F. MANBECK, JR.

*Attesting Officer*

*Commissioner of Patents and Trademarks*